Aug. 17, 1943.          P. G. EDWARDS                    2,326,770
                   TRANSMISSION SYSTEM REGULATION
                     Filed Sept. 9, 1941           2 Sheets-Sheet 1
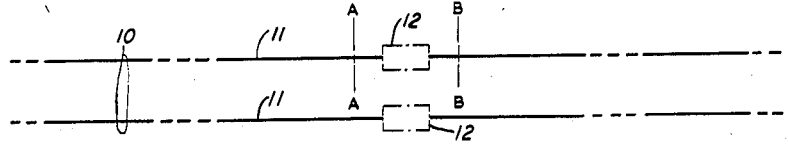
FIG. 1
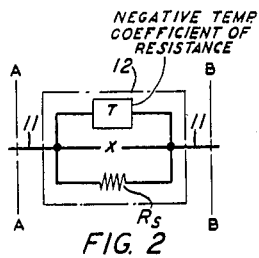
FIG. 2
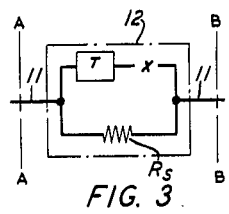
FIG. 3
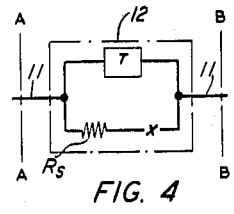
FIG. 4
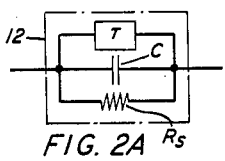
FIG. 2A
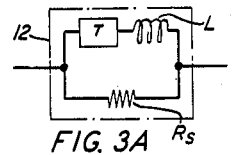
FIG. 3A
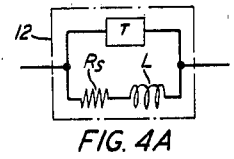
FIG. 4A
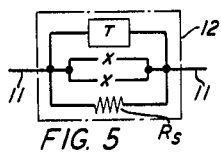
FIG. 5
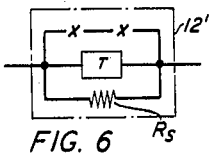
FIG. 6
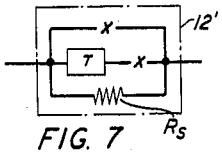
FIG. 7
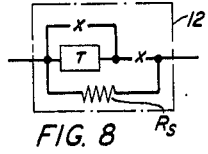
FIG. 8
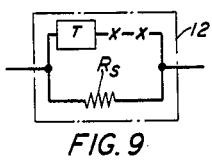
FIG. 9
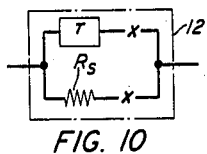
FIG. 10
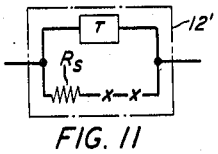
FIG. 11
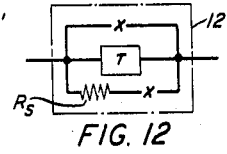
FIG. 12
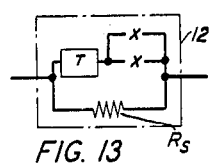
FIG. 13
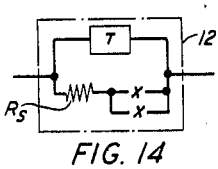
FIG. 14
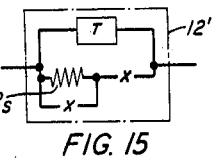
FIG. 15
FIG. 16
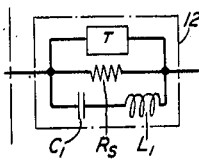
FIG. 17
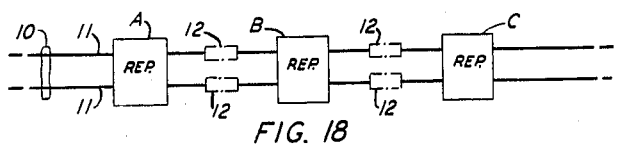
FIG. 18
INVENTOR
P. G. EDWARDS
BY
Robert J. Pluskey
ATTORNEY Aug. 17, 1943.  P. G. EDWARDS  2,326,770
TRANSMISSION SYSTEM REGULATION
Filed Sept. 9, 1941  2 Sheets-Sheet 2

INVENTOR
P. G. EDWARDS
BY
Robert J. Huskey
ATTORNEY

Patented Aug. 17, 1943

2,326,770

UNITED STATES PATENT OFFICE 2,326,770

TRANSMISSION SYSTEM REGULATION

Paul G. Edwards, Verona, N. J., assignor to Bell Telephone Laboratories, Incorporated, New York, N. Y., a corporation of New York Application September 9, 1941, Serial No. 410,149

25 Claims. (Cl. 178—45)

This invention relates to transmission lines and more particularly to means for compensating for variations in transmission characteristics of such lines due to variations in temperature. The arrangements of the invention are particularly adapted for use on a telephone line, either of the open wire or cable type.

An ordinary telephone line has a positive variation of resistance with temperature over the limited range embraced by atmospheric temperatures. In the United States Patent 2,050,703, to J. B. Johnson, August 11, 1936, there is disclosed a means for compensating for such a variation of resistance in the line due to temperature changes. This comprises inserting in the line a compensating unit comprising a variable resistance having a negative temperature coefficient of resistance in parallel with a resistance having a small temperature coefficient. By utilizing such a unit, the resistance changes in the line are compensated by the resistance changes in the unit.

Variations in temperature will not only cause variations in attenuation in a line, but will also cause variations in its impedance. It is an object of this invention to provide means which will not only compensate for variations in the attenuation of a line due to temperature changes, but will at the same time compensate for impedance changes in the line due to temperature changes. This is accomplished by inserting in the line a compensating unit comprising a temperature-dependent resistance element having a negative temperature coefficient of resistance, having associated with it a combination of one or more other elements, one of which may be a reactance, having their constants so chosen with respect to each other and the line that the unit will compensate for both attenuation changes and impedance changes in the line due to temperature changes. Another object of the invention is to compensate further for the impedance changes in the line due to temperature changes by utilizing a plurality of compensating units spaced at predetermined points, or at definite intervals, in the line. Other objects and features of the invention will appear more fully from the detailed description thereof hereinafter given.

A more complete understanding of this invention will be obtained from the detailed description which follows taken in conjunction with the appended drawings, wherein:

Fig. 1 represents a transmission line or path comprising a pair of telephone conductors or wires having inserted therein means or networks to compensate for variations in the characteristics of the transmission line with variations in climatic or atmospheric temperature;

Figs. 2, 3 and 4 illustrate in generalized form typical networks which, in accordance with the invention, may be employed for compensation purposes, the network incorporating a single reactance component or element;

Figs. 2A, 3A and 4A illustrate specific networks based upon those of Figs. 2, 3 and 4;

Figs. 5 to 15 illustrate additional networks in generalized form that may be employed in accordance with the invention, the networks of these figures, however, incorporating at least two reactance components or elements;

Figs. 16 and 17 show specific networks based upon the generalized networks of Figs. 6 and 13;

Fig. 18 illustrates a transmission system incorporating a plurality of repeaters or amplifiers at spaced intervals in a transmission line, with compensating networks inserted in the line intermediate the repeater points;

Figure 19:
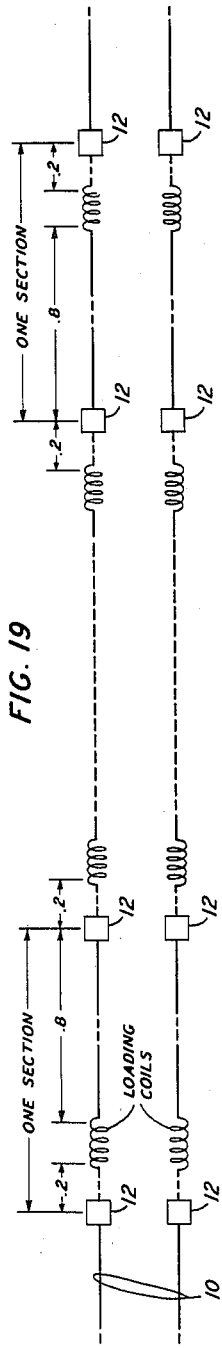
Fig. 19 illustrates a loaded transmission line in which compensating networks are inserted at the .2, .8 points between loading coils.

With particular reference to Fig. 1, there is shown therein a transmission path or line 10 extending between geographically separated regions or points, and comprising a pair of telephone conductors or wires 11. The line may be of the so-called open-wire type, or may comprise one of a large number of telephone pairs included in a suitable cable. Such a line will undergo both attenuation changes and impedance changes with variation in its temperature as determined by variation in the temperature of its surroundings. Inserted in the line at preassigned intervals and preferably in each conductor of the line for purposes of symmetry, is a compensator unit or network 12 to compensate in part or in whole for variations in the line characteristics with variations in its temperature. The unit 12 may be of the type disclosed in J. B. Johnson Patent 2,050,703 of August 11, 1936, but in accordance with this invention, it is preferred to employ a modification of such unit that includes one or more reactance components or elements. The line may be of the loaded or of the non-loaded type.

As shown in Figs. 2, 3 and 4, the unit 12 may comprise a temperature-dependent resistance element or thermistor T, and a resistance Rs of small temperature coefficient of resistance, for example, as suggested in the beforementioned Johnson patent, together with a reactance element or component indicated by the $x$ in each of Figs. 2, 3 and 4. This reactance element may be either capacitive or inductive, and in the arrangement of Fig. 2 is shown as connected in parallel with the resistance elements; in Fig. 3, it is shown as connected in series with the temperature-dependent resistance; and in Fig. 4, it is shown connected in series with the resistance Rs. The reactance element is included in the network in order to provide compensation for changes in the impedance of the line with changes in temperature and/or to control the attenuation-temperature-frequency characteristic.

Figs. 2A, 3A and 4A show compensating units or networks of the general type shown in Figs. 2, 3 and 4, respectively. The network or unit of Fig. 2A is particularly adapted for insertion in a loaded cable telephone pair over which voice frequency currents are to be transmitted. In this unit, a capacitance C is connected in parallel with the temperature-dependent resistance and the resistance Rs. The unit of Fig. 3A is adapted for use in a similar situation, but comprises an inductance L connected in series with the temperature-dependent resistance T. The network of Fig. 4A is particularly adapted for insertion in the conductors of a non-loaded telephone pair, for example, included in a cable over which carrier frequency currents are to be transmitted. In the arrangement of Fig. 4A, an inductance L is connected in series with the resistance Rs. With respect to the networks of Figs. 2A, and 3A, when they are included in the telephone pair in the manner indicated in Fig. 1, they provide compensation for both attenuation and impedance changes in the transmission line resulting from variations in the temperature of the latter.

A more exact compensation for the change in the attenuation and impedance characteristics of the transmission line may be obtained if two or more reactance elements are added to the Johnson type network. A large number of configurations is available and some of these are indicated in Figs. 5 through 15, inclusive. Each of these more complicated networks, identified by the designation 12', comprises a temperature-dependent resistance T, a resistance Rs of small temperature coefficient of resistance, and two reactance elements, the location of the latter being indicated by $x$ and being either capacitive or inductive. Figs. 16 and 17 show two specific networks each of which incorporates a capacitive and an inductive reactive element. In the arrangement of Fig. 16, the capacitive element $C_1$ is connected in series with the inductive element $L_1$, the series connection of these elements being in shunt with the element T and the resistance Rs. In the arrangement of Fig. 17, the capacitive and the inductive elements are connected in parallel, the parallel connection thereof being arranged in series with the element T. These elements enable a more exact compensation for impedance change in the lines with temperature and frequency change.

Fig. 18 shows a transmission system comprising a transmission path or line 10 having a plurality of repeaters A, B, C, inserted therein at spaced intervals, the conductors of the line intermediate the repeater points containing compensating networks or units 12 or 12' for purposes already indicated and to be treated in greater detail hereinafter.

In order that a better understanding may be had of the method of choosing and proportioning the various elements in the compensating units of the invention the following is pointed out.

Resistance compensation can be lumped in considerable amounts in either a loaded or a non-loaded telephone pair with satisfactory compensation of attenuation and impedance changes with temperature if proper consideration is taken regarding:

(1) The line impedance at the point of insertion and the proper determination of such a point;

(2) The frequency range it is desired to cover;

(3) The number and kinds of circuit elements in the compensating unit.

Consider first the compensation of the arrangement of the simple network of the parallel thermistor T and resistance Rs in its relation to a non-loaded pair of telephone conductors. For purposes of compensating attenuation, the resistance change of a full section of line, say 10 to 20 miles long, could be compensated by one such unit at or near the middle of the section up to say 3000 cycles. The effect on the terminal impedances is negligible. Above 3000 cycles, or thereabouts, it becomes necessary to consider the addition of additional elements. Fig. 4A shows the inclusion of an inductive element in the compensating unit or network so that the compensation varies with frequency in such a way that it is effective up to about 20 kilocycles or beyond, while the compensation and the impedance at frequencies below 2000 cycles may remain substantially unaffected. Thus, the network of Fig. 4A may be considered as an extension of the simpler two-element network to cover a wide frequency range. One reason for such a refinement is that, at higher frequencies, the inductance of the non-loaded line becomes important in determining the attenuation, reducing it below what it would be with zero line inductance. It then becomes desirable to vary the compensation accordingly, and one way to do this is the inclusion of a compensating element which varies with frequency in a complementary fashion. The compensating arrangement can be considered as being inserted in the line characteristic impedance. The insertion loss so caused would then vary with frequency both because of the variation with frequency of the characteristic impedance and the variation with frequency of the compensating unit. It is evident from this discussion, then, that the degree of matching of the compensation which is obtained is determined by the number and kind of elements which are included in the compensating unit. While the matter has been discussed on a physical basis, as will the following treatments, any and all of the assertions can and have been demonstrated mathematically, as well as applied in practice.

Consider now the effect on impedance in a non-loaded pair of telephone conductors. If the compensating unit, pure resistance for example, is included at the line terminals, it will add directly to the terminal impedance previously obtained. As the compensating unit is moved away from the terminal its effect on the impedance will be less and less due to the masking effect of the intervening line until, as noted above, at a distance of some 10 miles, its effect on the impedance is very small. The effect on attenuation, however, is substantially the same regardless of location with respect to the terminal of the line.

It is desired to point out here the importance of the location of the compensating unit or units in the circuit, and the general separation of their functions i. e. for attenuation or impedance compensation or both. In such an arrangement, the mutual dependence of the units can be considered, for while to a first order the functions can be separated as noted, nevertheless, to a second order they are to some extent mutually dependent.

With respect to loaded telephone lines, the situation is quite different. The phase shift of the circuit is relatively large compared to that in a non-loaded telephone pair, so that the compensating units should not be spaced at greater intervals than the loading coils except for special considerations considered below. This is in line with the generalized loading requirement of II coils per wave length. Assuming that a compensating unit per loading section is added, the location in the section is next to be decided. The characteristic impedance is different depending upon the location in the section and the direction faced. One location of interest is the constant resistance point, i. e. the 0.8, 0.2 point, where the resistance component of the line impedance is substantially constant and the reactance components in the two directions are conjugate. From well-known laws governing insertion losses, a pure resistance inserted at this point would cause an insertion loss determined only by the resistance component of the characteristic impedance and the inserted resistance, the reactances cancelling (as they do also at other points in the section where the reactance is not substantially zero). Since the effect which is to be compensated is substantially a flat loss with frequency, this method of inserting the compensation is satisfactory. A loaded transmission line embodying such compensation is illustrated by Fig. 19.

Figure 21:
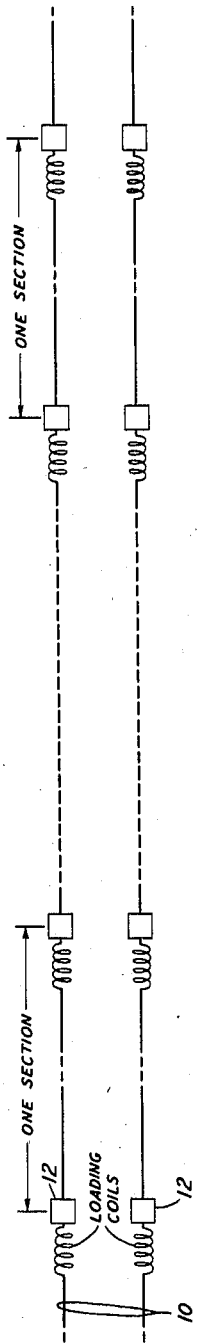
Fig. 21 illustrates a loaded transmission line in which compensating networks are inserted at the loading coils.

However, for practical reasons, it may be desirable to locate the compensation at some other point in the circuit, for example, it may be expedient to install it with the loading coils themselves as illustrated in Fig. 21. The resistance component at the coil decreases with frequency so that, if a resistance is inserted for compensating, the effect is to introduce a "twist," that is, the loss caused by the inserted resistances increases with frequency and the shape of the curve of loss vs. frequency is different for different temperatures. This is obviously undesirable. Figs. 2A and 3A show methods of correcting the situation by the addition of reactive elements. In Fig. 3A, for example, a positive reactance is included in series with the temperature-dependent resistance T. Without this inductance, the loss at 0° F. for example, at which the resistance of the element T is relatively high, is higher than the loss at 110° F., at which the resistance of the element T is low. The reactance tends to increase the inserted impedance at 110° F., but has little effect at 0° F. because of the relatively high resistance of the temperature controlled element T. The effect then is to raise the 110° compensated loss to make it equal to the 0° compensated loss. The network of Fig. 2A may also be used to remove the twist. The condenser which shunts the combination has more effect at 0° F., at which the temperature controlled material is of relatively high resistance, and so it tends to lower the 0° compensated loss to make it equal to the 110° compensated loss.

Figure 20:
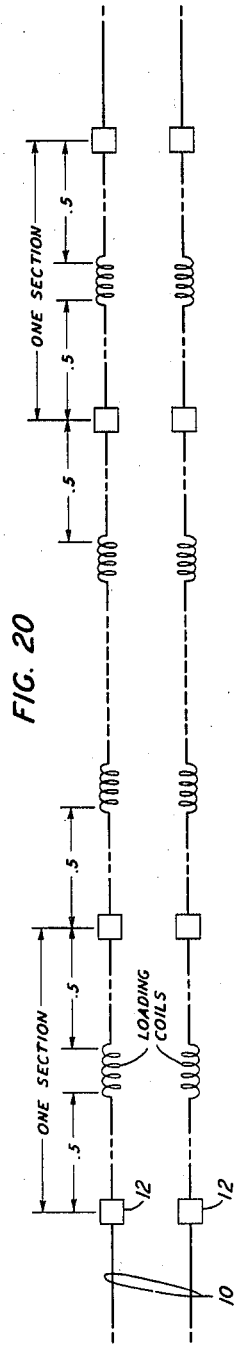
Fig. 20 illustrates a loaded transmission line in which compensating networks are inserted at the midpoints between the loading coils.

It should be obvious from the foregoing that other combinations are possible. For example, at mid-section, where the resistance component of the impedance increases with frequency, the reverse exists of the situation discussed above for compensation at the loading coil. Accordingly, use would be made of series capacitance instead of series inductance, and shunt inductance instead of shunt capacitance in Figs. 3A and 2A, respectively. A loaded transmission line in which the compensating network is inserted at the middle of the loading section is illustrated in Fig. 20.

However, another circumstance should now be pointed out. Since the impedance of the loaded telephone pair becomes high at and near the cut-off, the effect of leakage is pronounced at these high frequencies. This in itself introduces "twist" in a normal circuit such that 0° is higher than it would be without leakage, the leakage being greater at lower temperatures. Accordingly, in practice, it is quite convenient to permit the "twist" introduced at mid-section by the compensating unit without reactance to counteract the "twist" normally in the circuit caused by leakage.

Consider, now, impedance in a loaded telephone pair. For most of the frequency range, the impedance is substantially unaffected by resistance or resistance changes. At low frequencies (200–500 cycles approximately), however, the impedance does change with resistance as affected by temperature, and inclusion of the resistance temperature compensation improves the impedance and return loss at these frequencies.

If the usual range of frequency is employed on a loaded line i. e., from 0.7 to 0.75 of the cut-off frequency, it is desirable, as noted above, to include compensating elements in every loading section. The spacing in alternate loading sections causes a sharp impedance irregularity at 0.7 cut-off, and if it is agreed to use the frequency range only to 0.6 cut-off, for example, this spacing can be tolerated. Then, for example, the same design for each of the compensating units similarly located generally speaking can be used, for example, on high and low cut-off loaded lines.

While the arrangements of the invention have been disclosed as embodied in certain specific forms it is understood that they are capable of embodiment in many and widely varied forms without departing from the spirit of the invention as defined by the appended claims.

What is claimed is:

1. A transmission line whose attenuation and impedance characteristics vary with temperature, and means to compensate for such variations comprising an impedance network inserted in said line in series therewith, said network comprising a temperature-dependent resistance and a reactance element.

2. A transmission line whose attenuation and impedance characteristics vary with temperature, and means to compensate for such variations comprising an impedance network inserted in the line, said network comprising an element having a negative temperature coefficient of resistance and an element which is an inductance.

3. A loaded cable telephone pair over which voice frequency currents are to be transmitted, the attenuation and impedance characteristics of said cable pair being variable with temperature, and means to compensate for such variations comprising an impedance network inserted in said cable pair, said network comprising an element having a negative temperature coefficient of resistance and an inductance in series with said element.

4. A loaded cable pair whose attenuation and impedance characteristics vary with temperature, and means for compensating for such variations comprising an impedance network inserted in said cable, said network comprising an element having a negative temperature coefficient of resistance and a capacitance in shunt therewith.

5. A transmission line whose attenuation and impedance characteristics vary with temperature, and means to compensate for such variations comprising an impedance network inserted in said line in series therewith, said network comprising a temperature-dependent resistance and an inductance element.

6. A transmission line whose attenuation and impedance characteristics vary with temperature, and means to compensate for such variations comprising an impedance network inserted in said line in series therewith, said network comprising a temperature-dependent resistance and a capacitance element.

7. A transmission line whose attenuation and impedance characteristics vary with temperature, and means to compensate for such variations comprising an impedance network inserted in said line, said network comprising a temperature-dependent resistance and a reactance element in series shunted by a resistance of small temperature coefficient.

8. A transmission line whose attenuation and impedance characteristics vary with temperature, and means to compensate for such variations comprising an impedance network inserted in said line, said network comprising a temperature-dependent resistance and an inductance element in series shunted by a resistance of small temperature coefficient.

9. A transmission line whose attenuation and impedance characteristics vary with temperature, and means to compensate for such variations comprising an impedance network inserted in said line in series therewith, said network comprising a temperature-dependent resistance and a shunt around said resistance including a reactance element.

10. A transmission line whose attenuation and impedance characteristics vary with temperature, and means to compensate for such variations comprising an impedance network inserted in said line in series therewith, said network comprising a temperature-dependent resistance and a shunt around said resistance including an inductance element.

11. A transmission line whose attenuation and impedance characteristics vary with temperature, and means to compensate for such variations comprising an impedance network inserted in said line in series therewith, said network comprising a temperature-dependent resistance and a shunt around said resistance including a capacitance element.

12. The combination of a transmission line for transmitting a wide band of frequencies and whose attenuation tends to change in the same direction as that of its temperature and, in the upper portion of the frequency band being transmitted, tends to change in the opposite direction to that of frequency, and means inserted in said line to compensate for said tendencies whereby the attenuation remains substantially constant with temperature change and for all of the frequencies in the transmitted band, said means comprising a temperature-dependent resistance that changes in resistance in a direction opposite to that of the temperature and a reactance element that varies with frequency complementary to that of the line.

13. In combination, a loaded transmission line comprising a plurality of loading sections, the attenuation of said line tending to change in the same direction as that of its temperature, and means inserted in each loading section to maintain the effective attenuation of said line substantially constant with temperature change, said means comprising a temperature-dependent resistance whose resistance change is in the opposite direction to that of temperature change, said means being inserted at that point in the loading section at which the resistance component of the line impedance is substantially constant and the reactance components in the two directions of the line are conjugate.

14. In combination, a loaded transmission line in which an impedance network is included in each loading section in series with the line to compensate for attenuation change in said line with temperature change, said network comprising a temperature-dependent resistance and a reactance element.

15. In combination, a loaded transmission line in which an impedance network is included at each loading coil in series with the line to compensate for attenuation change in said line with temperature change, said network comprising a temperature-dependent resistance and a reactance element.

16. In combination, a loaded telephone pair, the attenuation and impedance characteristics of said telephone pair being variable with temperature, and means to compensate for such variation comprising an impedance network inserted in the telephone pair in series therewith, said network including an element having a negative temperature coefficient of resistance and being located between successive loading coils, spaced from one coil approximately .8 of the distance between the coils and from the other coil approximately .2 of the distance between the coils.

17. The combination of claim 16 in which said network also includes a reactance element.

18. The combination of claim 16 in which said network also includes a reactance in series with said resistance element.

19. The combination of claim 16 in which said network also includes an inductance in series with said resistance element, and a resistance of low temperature coefficient connected in parallel with the series-connected negative resistance element and inductance.

20. The combination of a transmission line subjected to variable temperature whereby the attenuation and impedance characteristics of the line vary with temperature and means serially included in said line and subjected to the same variable temperature as said line to compensate for the effect of such temperature variations on said characteristics, said means comprising an impedance network including an element having a temperature coefficient of resistance opposite to that of the line whereby resistance changes in said line and said element in response to temperature variations thereof tend to compensate one another, and a reactance element to compensate for the effect on the attenuation of the line of the inductance of the line with increasing frequency.

21. A transmission line whose attenuation and impedance characteristics vary with temperature and which is subjected to a variable temperature, and means to compensate for such variations in said characteristic comprising an impedance network inserted in said line in series therewith and subjected to the same variable temperature, said network comprising a temperature-dependent resistance that varies in resistance in a direction opposite to the variation in resistance of the line with temperature, and a reactance element for varying the reactive component of the impedance of the impedance network with increasing frequency so that the compensation for said variations in said characteristic is more exact than the compensation would be by said temperature-dependent resistance alone.

22. The combination of claim 21 in which said reactance element is an inductance.

23. The combination of claim 21 in which said transmission line comprises a loaded telephone pair over which voice frequency currents are to be transmitted and in which the reactance element of the impedance network comprises an inductance in series with the temperature-dependent resistance.

24. The combination of claim 21 in which the temperature-dependent resistance and the reactance element of the impedance network are connected in series, the series connection being shunted by a resistance of small temperature coefficient.

25. The combination of claim 21 in which the reactance element of the impedance network comprises an inductance connected in series with the resistance, the series connection being shunted by a resistance of small temperature coefficient.

PAUL G. EDWARDS.